April 6, 1948.     E. I. STEARNS, JR     2,439,373
FLICKERING BEAM PHOTOMETER

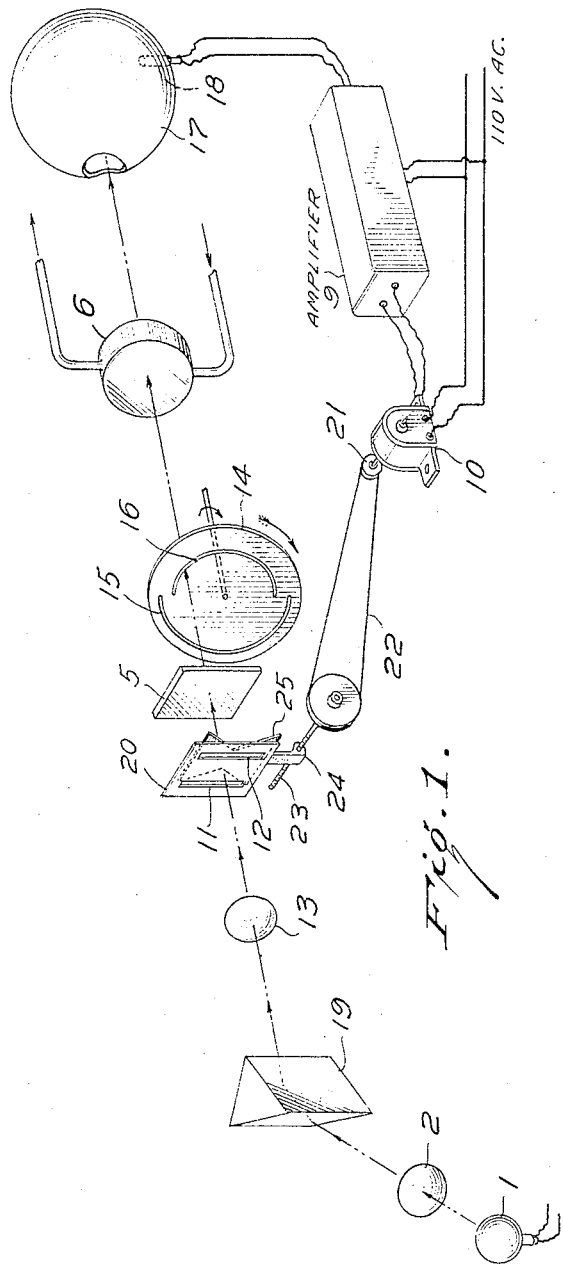

Filed Sept. 27, 1944     2 Sheets-Sheet 2

INVENTOR
EDWIN I. STEARNS, JR.
BY Robert Hume Norton
ATTORNEY

Patented Apr. 6, 1948

2,439,373

UNITED STATES PATENT OFFICE 2,439,373

FLICKERING BEAM PHOTOMETER

Edwin I. Stearns, Jr., Plainfield, N. J., assignor to American Cyanamid Company, New York, N. Y., a corporation of Maine Application September 27, 1944, Serial No. 555,941

2 Claims. (Cl. 250—41.5)

This invention relates to a flickering beam photometer.

In the past a number of valuable optical instruments have been constructed of the flickering beam type, of which one of the best known is the polarized light flickering beam spectrophotometer. For spectrophotometric work these instruments have achieved great practical success. However, they are rather complicated and expensive and there are many operations where a different and simpler type of instrument is desirable.

The present invention is directed to instruments in which 1 or 2 beams are formed from a source of light and a sample to be photometered is subjected to alternating beams of different colors. If the colors are chosen at suitable points in the spectrum where various components of a multicomponent sample have markedly different absorption characteristics, any change in the concentration of the components can be determined. The instrument requires no complicated monochromator or polarizing device, but within its field gives results which are as good as those obtained with the more expensive and complex instruments.

The instruments of the present invention are of two types. In the first there is a single physical beam of light from the source and different filters are successively and rapidly interposed therein, so that the sample is successively struck by the beam after passing through different filters which results in successive illumination with beams of two different colors. In the second modification the beam is split into two beams of different colors, and these beams are alternately projected onto or passed through the sample. In both cases the integrated light is impressed on the same photoelectric element, and where there is any unbalance a flicker frequency electric signal results which can be amplified and used for control or measurement purposes, or both. Where filters are available a simple mechanism, in which a single beam of light and movable filters are used, is preferable. Where, however, suitable filters are unavailable and where it is desired to measure for unbalance, with or without control features, the split beam modification is preferable.

The present invention includes only the elements from light source to photoelectric element. The details of the treatment of the resulting electric signal form no part of the present invention. Amplification is by known or conventional means and amplified output may be used for control or measurement purposes in a manner which in most instances is conventional.

The results obtained from the extremely simple devices of the present invention are as useful for photometric purposes as those obtained from more complex instruments. At the same time, since the spectral bands used in the beams need not be extremely narrow, no problem of inadequate energy will result, which is so serious a problem with some of the complicated flickering beam spectrophotometers. It is, therefore, an advantage of the present invention that it is possible in most cases to use much less sensitive amplification, which avoids many difficulties encountered with extremely high gain amplifiers. Many of the devices, particularly the more simple modifications, are essentially one purpose instruments, and it is an advantage that they can be constructed at such a reasonable price that large numbers may be used to control a number of different operations.

The device of the present invention is designed to measure the ratio of absorptions at two points in the spectrum. The ratios are measured directly instead of drawing a complete curve of each color and then comparing the curves. It is always more accurate and in the present case also more rapid to measure the ratios directly. This increased speed and accuracy is an important advantage of the present invention.

Some of the most important practical uses of the devices of the present invention fall within the visual light spectrum. The devices, however, are in no sense limited thereto, and on the contrary it is readily adaptable for use in the ultraviolet and feasible in the infrared, although when dealing with the far infrared, halide optics and the difficulty of obtaining sharp band pass filters raise some problem. The advantages are, therefore, more marked in the spectrum ranging from ultraviolet through the visual spectrum in the near infrared. A single machine may be used for this whole range employing quartz optics, and it is an advantage of the present invention that one machine can be adapted for use in various parts of the spectrum by the choice of suitable filters.

The invention will be described in greater detail in conjunction with the drawings, in which:

Fig. 1 is a diagrammatic view of the optics of a split beam instrument;

Figure 4:
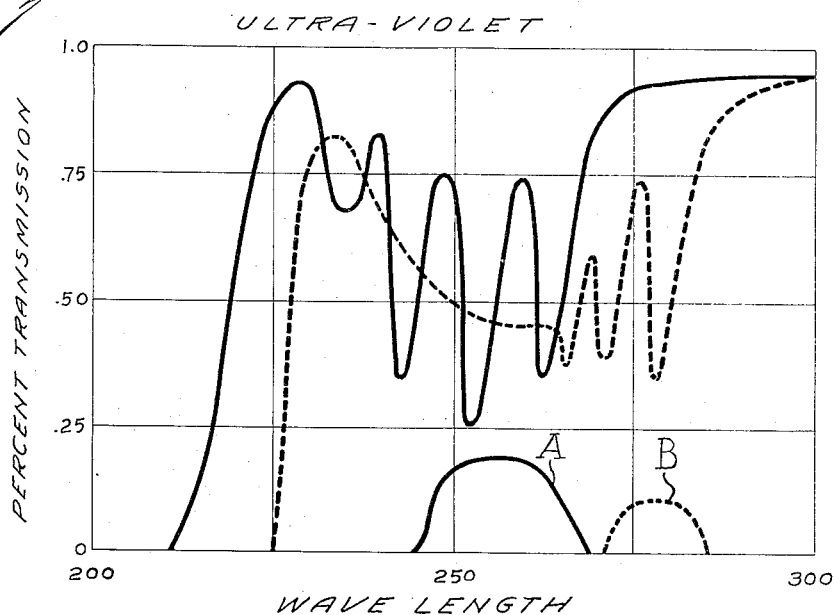
Fig. 4 is a series of transmission curves for benzene and toluene in the ultraviolet together with filter transmission curves.

Fig. 1 represents an instrument in which radiation from the source 1 is collimated by the lens 2 and then passes through the dispersing prism 19. This produces a spectrum which is imaged by the lens 13, on the plane of the plate 20, which is provided with two slits 11 and 12 corresponding to narrow spectral bands. This results in effect in splitting the beam into two colored beams, one passing through one slit and one through the other. The beams then pass through a leveling filter 5 and encounter an eccentrically mounted disk 14 provided with two slots 15 and 16, each extending through a semi-circle. One slot registers with one slit and the other with the other slit. The two beams then pass through the sample container 6 and into an integrating sphere 17 provided with a phototube 18.

Rotation of the disk 14 causes the sample to be illuminated first with the beam from one slit and then with the beam from the other. Balance may be obtained for a pre-determined mixture of colored components in the sample and any unbalance will result in production of a flicker frequency signal in the output of the phototube 18. This is amplified by the amplifier 9 and the output turns the motor 10, which is provided with a pulley 21 and cable 22, which in turn rotates the threaded shaft 23 on which is fitted a nut 24 attached to the plate 25 which plate carries two triangular openings with their apices toward the center. The apices do not quite meet but are separated by a strip of metal of a width considerably greater than the slits. For balance the position of the plate 25 is such that each slit is equally exposed by the triangular openings. Any unbalance results in a rotation of the motor 10 which moves the plate in a direction to increase the area of the more strongly absorbed beam and decrease the area of the less strongly absorbed beam. Rotation continues until the plate 25 has moved sufficiently to restore balance. The movement of the plate 25, or what is the same thing, the amount of rotation of the motor 10, is a measure of the unbalance.

Figures 2, 3:
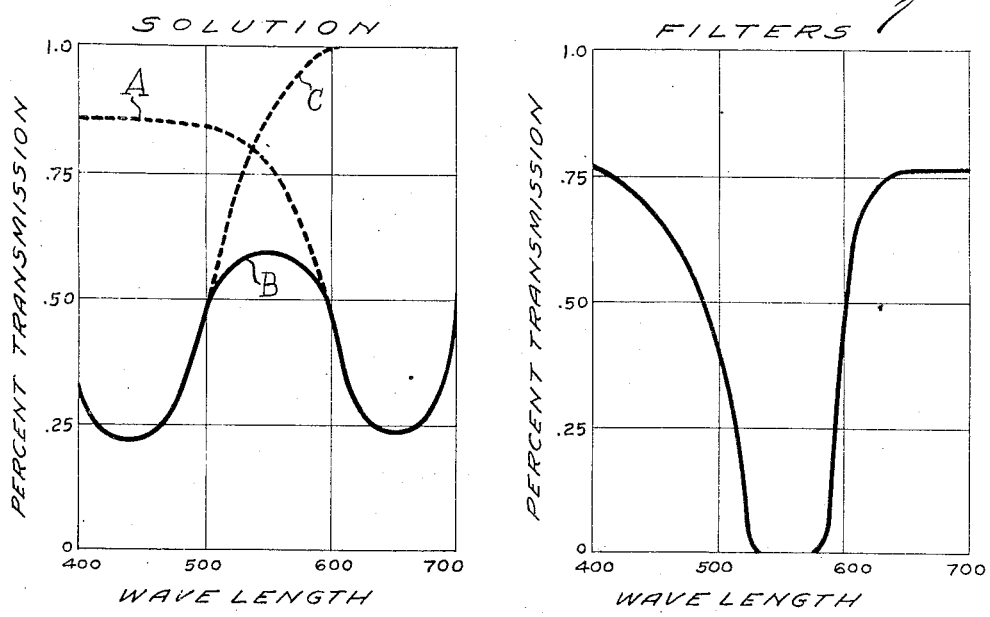
Fig. 2 is a series of transmission curves of a dye mixture.
Fig. 3 is a series of transmission curves of filters to be used with the dye mixture of Fig. 2.

The operation of the devices of the present invention will be described in conjunction with two different types of problems. The first is the production of a mixture of dyes, for example, a mixture of yellow and blue dyes to produce a predetermined shade of green. Fig. 2 shows the curves of the two dyes, A for the blue one and C for the yellow one. A solid curve B represents the resulting green shade. In order to maintain a given shade constant filters should be used which transmit two bands of light in portions of the spectrum where there is a difference in the transmission of the two dyes. One of the slits 11 and 12 is positioned to transmit a narrow band in the blue portion of the visible spectrum and the other slit in the red portion.

When the instrument of Fig. 1 is used the slits 11 and 12 are so chosen and the prism 19 so located that one slit will transmit light from, say, 600 to 700 millimicrons, and the other 400 to 500 millimicrons. The plate 25 is adjusted so that the two beams striking the integrating sphere 17 are of equal intensity. A suitable filter 5 is provided to adjust the level of illumination to a point where the phototube 18 operates effectively. There will then be a balance for the predetermined mixture of yellow and blue dyes, and as long as this balance is maintained there will be no flicker frequency signal in the output of the phototube 18. If the predetermined composition is not maintained, let us suppose that if the yellow dye increases, there will be more light striking the phototube when the beam corresponding to the red portion of the spectrum illuminates the integrating sphere than when the beam corresponding to the blue portion is the illuminant. This will result in a signal in the output of the phototube at flicker frequency, the phase being such that the motor 10 turns in a direction to increase the flow of blue dye or decrease the flow of yellow dye, or both. As soon as the motor has turned to the point where the two dyes are again in balance there will be no signal from the phototube 18 and the motor will stop. If then more blue appears in the mixture there will again be an unbalance but this time the phase of the flicker frequency signal will be the opposite and the motor 10 will turn in a direction to increase the amount of yellow dye.

If it is desired to measure only, the plate 25 will determine the point at which balance is again restored and will give a measure of unbalance. If the instrument is to control only, the cable is disconnected from the drive of the plate 25 and the instrument will then operate as a pure control instrument.

Another problem is concerned with mixtures of benzene and toluene. Fig. 4 shows the absorption bands in the two substances, A being that for benzene and B for toluene. C and D show suitable filters. In the modification shown in Fig. 1 the slits 11 and 12 may be so positioned as to transmit a narrow band corresponding to the peak of the curve A just to the right of the 250 millimicron line and the absorption peak of the curve B just to the right of the 300 millimicron band, respectively. Ultraviolet light of the band of filter D will show much higher transmission through benzene than through toluene. Through filter C the transmission of the two components is about the same. If the proportion of toluene increases the transmission through filter D will be less, whereas if the proportion of benzene increases the transmission of the beam through the filter D will be greater. The operation of the machine is, of course, the same as with a mixture of blue and yellow dyes.

It will be noted that the instrument of the present invention possesses the advantage that either operation is practically independent of fluctuations in intensity of the light source provided the intensity changes are slow and exactly uniform emission of the source of radiation is unnecessary. This is a valuable feature as it is a difficult matter to keep the intensity of the source constant with time.

In the drawings there is shown a relatively small sample cell 6. This is suitable where samples of high absorption are encountered, such as for example, liquids. The present invention, however, is in no sense limited to devices in which liquids are measured. It is equally applicable to the measurement of gases where there is a sufficiently strong absorption. When used in the control or measurement of gaseous mixtures larger cells should be employed to provide a longer path to compensate for the smaller specific absorption of gases. The measurement of gases is not as common in the visual spectrum as in the infrared. It is an advantage of the present invention that it is useful with small modifications throughout a wide range, and a single instrument can be adapted for various measurements. This is particularly true of the modification of Fig. 1, where different parts of the spectrum may be chosen by suitable rotation of the prism 19. In this latter device any dispersion element may be used in place of the prism, for example, a diffraction grating may be employed. As the openings in plate 20 pass a relatively wide band the difficulties encountered with the excessively high resolution of diffraction gratings in the infrared are absent and these gratings may therefore be used and still give adequate amounts of radiant energy.

A phototube is shown in the drawings as this is the most efficient photoelectric device for the visual range and also for adjacent bands in the ultraviolet and infrared. Any other photoelectric device may be used, for example, thermocouples or bolometers, which permit operation further in the infrared.

I claim:

1. A flickering beam photometer comprising in optical alignment a source of radiation of wave length sufficiently short to obey optical laws, dispersing means capable of producing a spectrum, an opaque plate provided with two openings passing two beams of spectral characteristics, means for containing a sample to be measured in the path of said two beams, a radiation detector receiving light from the two beams and capable of transforming variations in radiant energy into radiations of electrical current, and means for rapidly and alternately occulting first one beam and then the other.

2. A device according to claim 1 in which the output from the radiation detector is amplified, impressed on a reversible electric motor and means driven by the latter are provided for varying the area of the two openings in the plate in opposite phases, the motor operating said means in a direction to bring about balance of integrated light on the radiation detector.

EDWIN I. STEARNS, Jr.

REFERENCES CITED

The following references are of record in the file of this patent:

UNITED STATES PATENTS

| Number | Name | Date |
|---|---|---|
| 1,849,607 | Bernheim | Mar. 15, 1932 |
| 1,898,219 | Sharp | Feb. 21, 1933 |
| 2,046,958 | Marvin | July 7, 1936 |
| 2,078,768 | Meier | Apr. 27, 1937 |
| 2,166,824 | Runaldue | July 18, 1939 |